United States Patent
Binder et al.

(10) Patent No.: US 8,845,838 B2
(45) Date of Patent: Sep. 30, 2014

(54) METHOD FOR PRODUCING A STEERING WHEEL

(75) Inventors: Robert Binder, Rodenbach (DE); Maik Adelberger, Großstheim (DE); Norbert Zwiessler, Altenbuch (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 956 days.

(21) Appl. No.: 12/619,724

(22) Filed: Nov. 17, 2009

(65) Prior Publication Data

US 2010/0147103 A1 Jun. 17, 2010

(30) Foreign Application Priority Data

Nov. 19, 2008 (DE) .......................... 10 2008 057 971

(51) Int. Cl.
*B27D 1/08* (2006.01)
*B62D 1/06* (2006.01)

(52) U.S. Cl.
CPC ... *B62D 1/06* (2013.01); *B27D 1/08* (2013.01)
USPC ............................. 156/222; 156/224; 156/256

(58) Field of Classification Search
None
See application file for complete search history.

(56) References Cited

U.S. PATENT DOCUMENTS

| 1,435,745 A | * | 11/1922 | Schirmer ........................ 74/552 |
| 2,399,348 A | * | 4/1946 | Hobbs ......................... 144/256.1 |
| 6,249,970 B1 | | 6/2001 | Cattaneo |

FOREIGN PATENT DOCUMENTS

| DE | 1 630 913 | 3/1970 |
| DE | 69807133 | 4/2003 |
| DE | 10321220 | 12/2004 |
| EP | 0898538 | 11/1999 |

* cited by examiner

*Primary Examiner* — Barbara J Musser
(74) *Attorney, Agent, or Firm* — Tarolli, Sundheim, Covell & Tummino LLP

(57) ABSTRACT

A method for producing a steering wheel (10) including a multilayered decorative trim (16) comprises the following steps:
  providing a multilayered body composed of flat layers joined to each other, the body being bent transversely or perpendicular to the plane of the layers into a shape adapted to the geometry of a steering wheel body part (14),
  cutting off a thin arcuate decorative layer (26) from a lateral surface of the body, in particular essentially perpendicular to the bending axis, and
  adapting said decorative layer (26) to and applying it onto said steering wheel body part (14).

21 Claims, 5 Drawing Sheets

METHOD FOR PRODUCING A STEERING WHEEL

FIELD OF THE INVENTION

The invention relates to a method for producing a steering wheel including a multilayered decorative trim.

BACKGROUND OF THE INVENTION

Decorative trims are used in vehicles on steering wheels or parts thereof so as to give the steering wheel a high-class individual appearance. Frequently, wood is used as material for such decorative trims. The wood is applied in thin layers to the steering wheel body or to parts thereof. For optical reasons, it is desirable to adapt the course of the grain or of the individual layers of the decorative trim to the shape of the respective steering wheel part. In particular, in the case of a steering wheel rim it is desirable that the fiber course of the decorative trim follows the curve of the steering wheel rim. Heretofore such trims were crafted by hand by applying the wooden elements individually onto the steering wheel body.

SUMMARY OF THE INVENTION

It is an object of the present invention to provide a simpler and faster method for producing a steering wheel including a multilayered decorative trim.

To solve this object, a method is provided for producing a steering wheel including a multilayered decorative trim, the method comprising the steps of:
 providing a multilayered body composed of flat layers or plies joined to each other, the body being bent transversely or perpendicular to the plane of the layers into a shape adapted to the geometry of a steering wheel body part,
 cutting off a thin arcuate decorative layer from a lateral surface of the body, in particular essentially perpendicular to the bending axis, and
 adapting the decorative layer to and applying it onto the steering wheel body part.

The decorative layer obtained by providing the body and subsequent cutting off is already adapted to the geometry of the steering wheel body part so that it can directly be applied onto the steering wheel body part. This greatly reduces the amount of work required and allows for a faster and more cost-effective production.

The multilayered body is preferably produced by joining individual flat layers by means of an adhesive and by bending the body transversely or perpendicular to the plane of the layers into a shape adapted to the geometry of the steering wheel body part. Several decorative layers may be cut off from this body so that several steering wheels may by produced using one body.

Ideally, the bending of the body is carried out prior to drying/hardening of the adhesive and the body is held in shape until the adhesive has dried/hardened. Prior to hardening of the adhesive, the body can be adapted more easily to the shape, since the individual layers are not yet joined together by the adhesive.

So as to apply such a decorative trim, for instance, to the steering wheel rim of a vehicle, the body is preferably bent concentrically to this steering wheel body part.

In this case the multilayered body is bent in the form of a segment of a circle, and the bending radius is adapted to the radius of the steering wheel part.

For instance, the body may be bent to form a cup or trough which is semi-circular in cross-section. From two decorative layers cut off from this body a more or less fully closed tube may be assembled which can be used, for instance, to produce a decorative trim which covers the entire circumference of a steering wheel rim (seen in a radial section of the steering wheel).

The inventive method is particularly suited for producing a body which includes at least one layer of wood veneer.

So as to make the appearance of the cut-off decorative layers as uniform as possible, the grains of the layers are preferably oriented in the same direction.

In a preferred embodiment, the grains of the layers essentially run in the cut-off direction of the decorative layer. This ensures that the run of the grain or of the fibers of the material layers follows the shape of the steering wheel body part.

Depending on the desired appearance, the individual layers of body may have different colors and/or materials.

For instance, in a top view of the steering wheel, the decorative trim encompasses the entire circumference of the steering wheel rim. Thus, the steering wheel rim is given a high-class appearance. However, it is also conceivable that the steering wheel rim is provided with several decorative trims circumferentially adjoining each other.

Preferably, the decorative trim completely encompasses the steering wheel rim in cross-section (radial section) such that the steering wheel rim is given the visual appearance of a wooden steering wheel rim. This can also be achieved by several decorative trims adjoining each other along the circumference of the cross-section.

The decorative trim is preferably applied to the steering wheel body part by means of adhesive bonding. This does not require any visible fastening means so that the visual appearance of solid wood is preserved.

After it has been cut off, the decorative layer may be formed into an arcuate cup or trough. Thus, the decorative layer is further adapted to the shape of the steering wheel body part so as to reduce stress in the decorative layer or in the adhesive after it has been applied to the steering wheel body part.

The decorative layer may be obtained, for instance, by planing it off the multilayered body.

Also claimed is a steering wheel produced according to an inventive method.

BRIEF DESCRIPTION OF THE DRAWINGS

Further advantages and features of the invention will be apparent from the following description with particular reference to the accompanying drawings, in which.

DESCRIPTION OF EXAMPLE EMBODIMENTS

Figure 1:
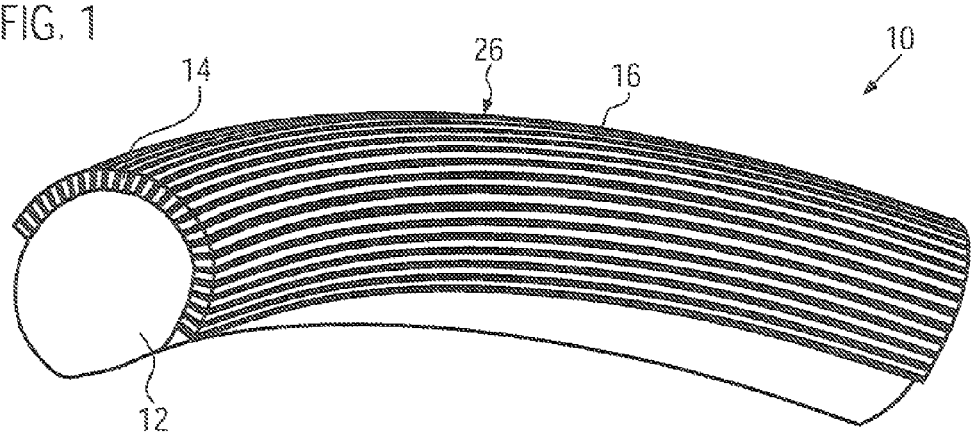
FIG. 1 shows a steering wheel body part of a steering wheel according to the invention including a multilayered decorative trim.
Figure 3:
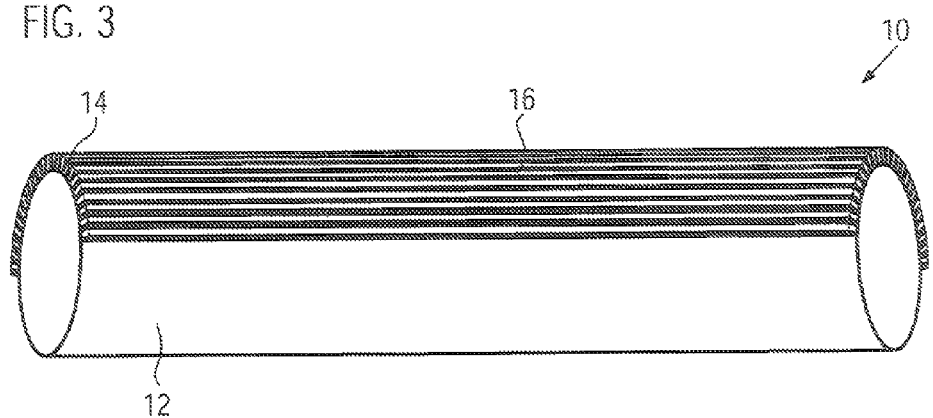
FIG. 3 represents a third view of the steering wheel body part of FIG. 1.

FIG. 1 shows a detail of a steering wheel 10, here a detail of a steering wheel rim 12 including a steering wheel body part 14 and a multilayered decorative trim 16 which is applied to the steering wheel body part 14 and extends across half of the circumference of the steering wheel rim 12 seen in a radial section (FIG. 3).

The steering wheel body part 14 is a steering wheel skeleton which, if necessary, additionally also sheathed, for instance, injection-molded or foam-coated.

Figure 2:
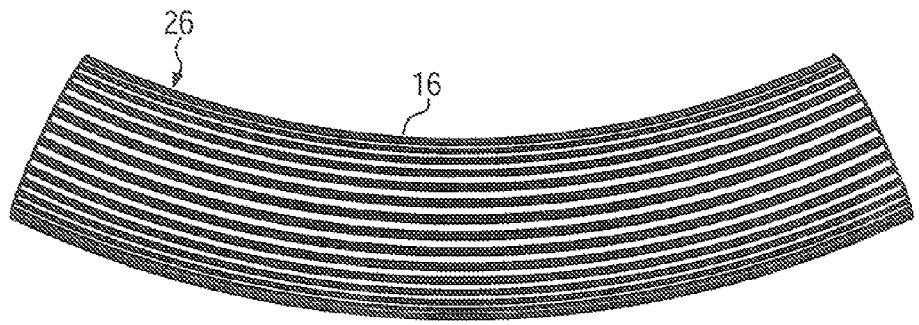
FIG. 2 is a second view of the steering wheel body part of FIG. 1.

As is evident, in particular from FIG. 2, the decorative trim 16 consists of several layers 18, 20 in parallel to each other which are alternatingly arranged, for instance, in two different colors. Here, the decorative trim 16 is bent in one plane (cf. FIG. 2) in the form of a segment of a circle and in another plane (in a radial section) bent in the form of a cup such that the layers 18, 20 lie concentrically to the steering wheel body part 14. The run of the grain or of the layers 18, 20 thus follows the curve of the steering wheel body part 14.

Figure 4:
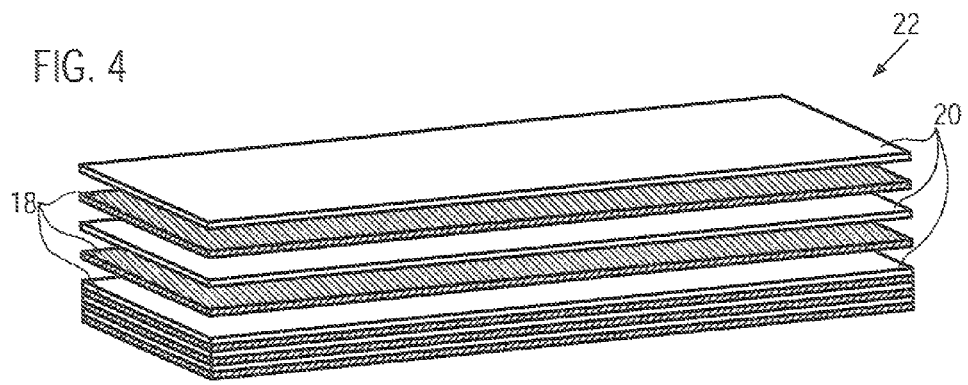
FIG. 4 shows a multilayered body for producing the decorative trim in a first production step.

For producing such a decorative trim 16, in a first step, a body 22 is produced from several flat layers 18, 20 of a material, here wood veneers. To this end, an adhesive is applied to the layers 18, 20 and they are placed flatly on top of each other (FIG. 4).

Figure 5:
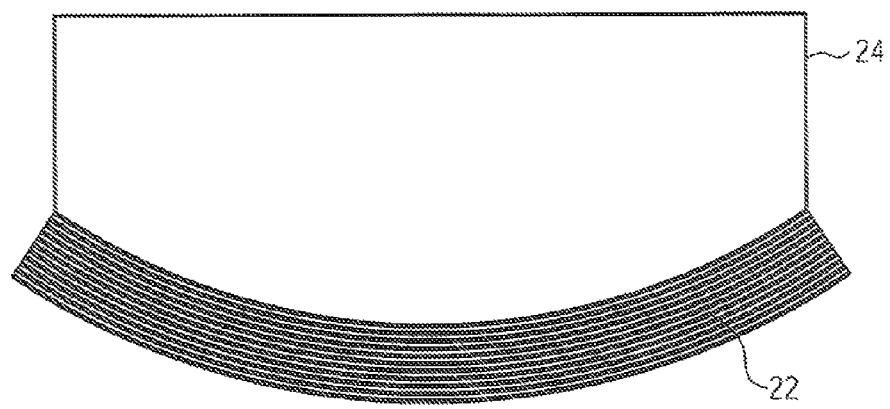
FIG. 5 shows the multilayered body of FIG. 4 in a further production step.
Figure 6:
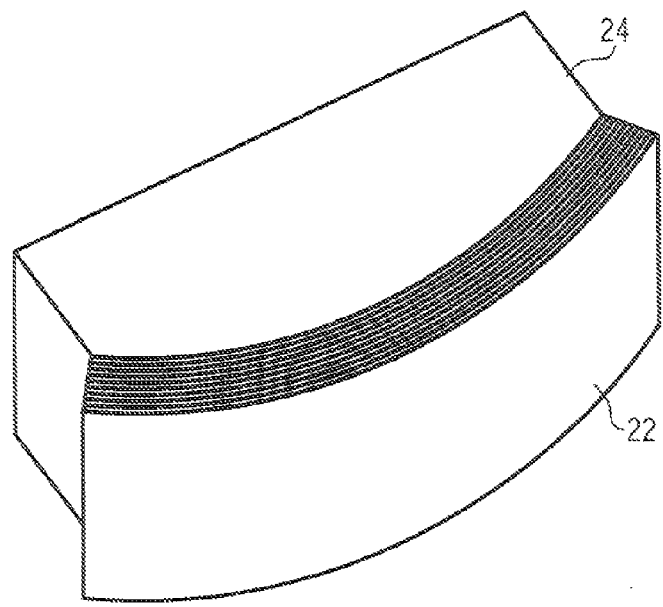
FIG. 6 is a further view of the multilayered body of FIG. 5.
Figure 7:
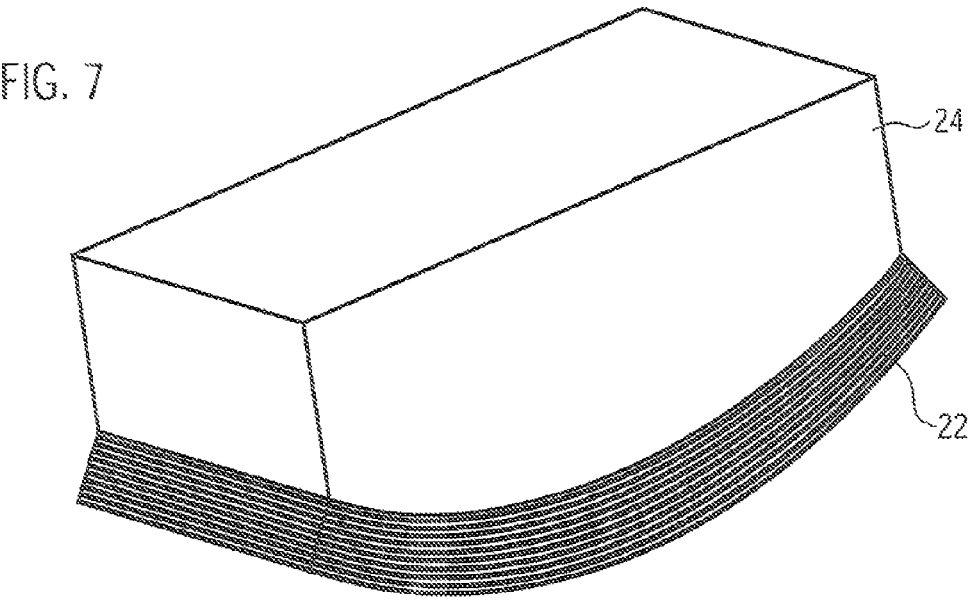
FIG. 7 is an additional view of the multilayered body of FIG. 5.

In a next step, the body 22 thus obtained is pressed into a shape adapted to the geometry of the steering wheel body part 14. By means of a punch 24 the body 22 is bent obliquely or perpendicular to the plane of the layers 18, 20 (FIGS. 5 to 7). Here the punch 24 is in the form of a segment of a circle such that the body 22 is formed as a cup in the form of a segment of a circle. The radius of the segment of a circle corresponds here to the radius of the steering wheel rim 12.

This procedure is carried out prior to hardening of the adhesive, preferably directly after joining the layers 18, 20. Subsequently, the body 22 is held in its bent position by the punch 24 until the adhesive has hardened such that the body 22 retains this shape after hardening.

Figure 8:
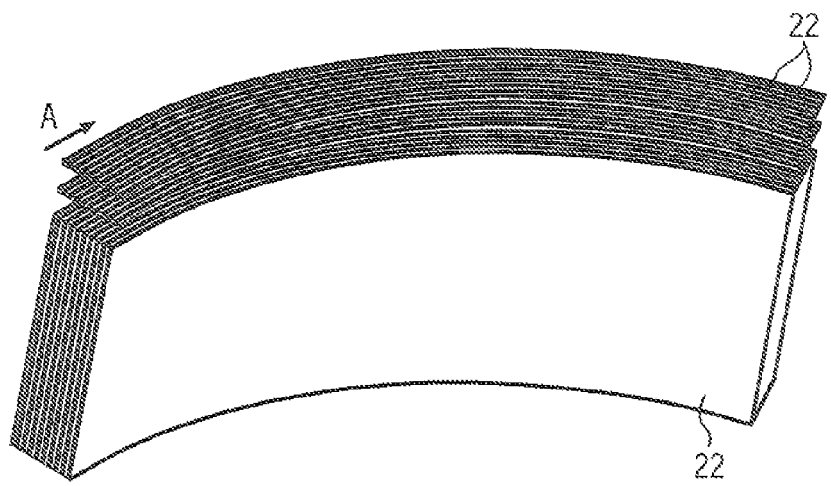
FIG. 8 shows a further production step of the decorative layer.
Figure 9:
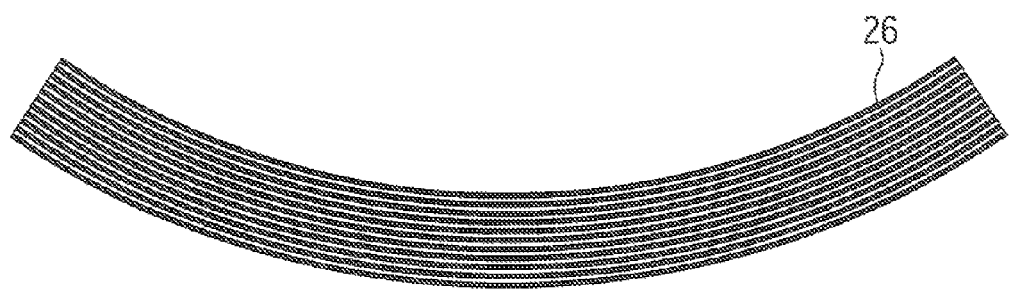
FIG. 9 is a sectional view of the body of FIG. 4.

In a next step, a thin decorative layer 26 is planed off from a lateral surface of the body 22 (FIG. 8). Preferably, the cut-off direction A extends perpendicular to the bending axis such that the cut-off decorative layer 26 is bent in the form of a segment of a circle (FIG. 9).

Figure 10:
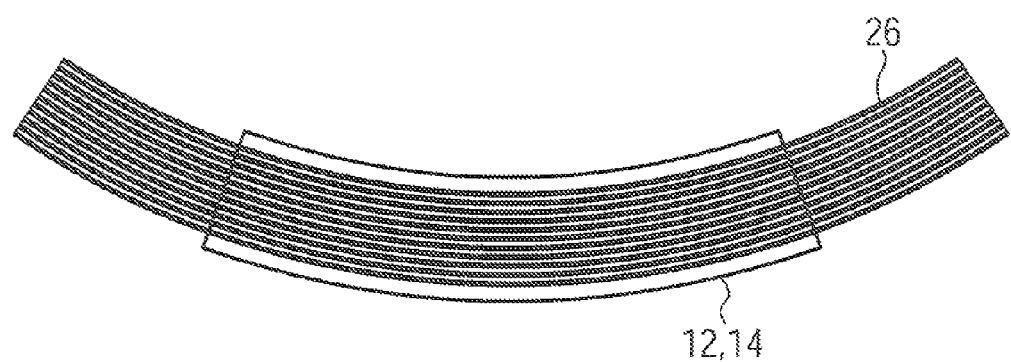
FIG. 10 shows the body of FIG. 4 with a steering wheel body part.

As can be seen in FIG. 10, the decorative layer 26 thus cut-off has the shape of the steering wheel body part 14. The flat decorative layer 26 is adapted to the dimensions of the steering wheel body part by punching and is subsequently formed by bending such that the decorative layer 26 is given the shape of the cross-section of the steering wheel body part 14 and adopts the shape of a cup or trough. Subsequently, the decorative trim 16 thus produced is glued onto the steering wheel body part 14.

The decorative trim 16 may be processed further, before or after it is attached to the steering wheel body part 14, for instance, so as to treat the surface of the decorative trim 16 or so as to obtain additional color effects. In the case of a decorative trim 16 with wood veneer being used for the layers 18, 20, colors may for instance be matched by staining or a more resistant surface may be obtained by varnishing.

The decorative trim 16 here merely covers a part of the circumference in a top view of the steering wheel rim 12. However, embodiments are also possible where the entire circumference of the steering wheel rim 12 is provided with a continuous decorative trim 16. Yet, it is also conceivable to provide several decorative trims 16 which adjoin each other and cover the entire circumference of the steering wheel rim 12 or parts thereof.

Differing from the embodiment depicted here where the decorative trim 16 encompasses half of the circumference of the steering wheel rim 12 in cross-section (radial section), also embodiments are conceivable where the decorative trim 16, for instance, encompasses the entire circumference of the cross-section.

The decorative trim 16 may also be attached to any other part of the steering wheel 10. In particular, it does not have to be provided on the steering wheel rim 12.

Depending on the desired decorative trim or the shape and position of the steering wheel body part 14, the body 22 is bent into the corresponding shape adapted to the geometry of the steering wheel body part 14. In particular, this shape does not have to be in the form of a segment of a circle. The bending may be carried out perpendicular or transversely to the plane of the layers 18, 20. It is also conceivable to adapt the body 22 to the shape only after hardening of an adhesive.

Instead of the wood veneer used here for the layers 18, 20 the decorative trim 16 may be produced from any other flat material. In particular, combinations of different materials are possible. The thickness of the layers 18, 20 as well as the colors may be varied at will.

Also, the direction of the grain of the individual layers 18, 20 may be varied depending on the appearance desired. The grain may also run perpendicular to the cut-off direction. In particular, it is not required that all layers 18, 20 have the same orientation of grain.

Instead of the adhesive bonding of the decorative trim 16 to the steering wheel body part 14 any other suitable method may be used for attaching the decorative trim 16 to a steering wheel body part 14.

Adapting the decorative trim 16 to the dimensions of the steering wheel body part 14 is not restricted to the punching shown here. The decorative trim 16 may also be adapted to the steering wheel body part 14 by means of any other suitable method. Depending on the material used and depending on the steering wheel body part it may also not be necessary to adapt the decorative trim 16 in further production steps to the shape of the steering wheel body part 14.

The invention claimed is:

1. A method for producing a steering wheel (10) including a multilayered decorative trim (16), the method comprising the steps of:
   providing a multilayered body (22) composed of flat layers (18, 20) joined to each other, a pair of said flat layers (18, 20) defining an interface that extends in a plane, said multilayered body being bent about an axis that extends parallel to the plane of the interface into a shape of a steering wheel body part (14),
   cutting off a thin arcuate decorative layer (26) from a lateral surface of said multilayered body (22) that extends in a plane that is substantially perpendicular to the bending axis, and
   adapting said decorative layer (26) to said steering wheel body part (14) to produce the multilayered decorative trim (16) and applying the decorative trim onto said steering wheel body part.

2. The method according to claim 1, wherein said multilayered body (22) is produced in the following steps:
   joining said individual flat layers (18, 20) by means of an adhesive,
   bending said multilayered body (22) about the bending axis extending parallel to the plane of the interface into a shape of said steering wheel body part (14).

3. The method according to claim 2, wherein the bending of said multilayered body (22) is carried out prior to the drying/hardening of the adhesive and said multilayered body (22) is held in shape until the adhesive has dried or hardened.

4. The method according to claim 1, wherein said multilayered body (22) is bent concentrically to said steering wheel body part (14).

5. The method according to claim 1, wherein said multilayered body (22) is bent in the form of a segment of a circle and the bending radius corresponds to a radius of said steering wheel body part (14).

6. The method according to claim 5, wherein said multilayered body (22) is bent into a semicircular cup.

7. The method according to claim 1, wherein at least one flat layer (18, 20) is a wood veneer.

8. The method according to claim 7, wherein each of a plurality of said flat layers (18, 20) is a wood veneer, a grain of each of said flat layers (18, 20) of the wood veneer being oriented in the same direction.

9. The method according to claim 8, wherein the grains essentially run in a cut-off direction (A) of said decorative layer (26) that extends perpendicular to the bending axis.

10. The method according to claim 1, wherein said flat layers (18, 20) have different colors and/or materials.

11. The method according to claim 1, wherein a steering wheel rim (12) of the steering wheel (10) is provided over its entire circumference about a rotational axis of the steering wheel (10) with a continuous decorative trim (16) or with several decorative trims (16) adjoining each other.

12. The method according to claim 1, wherein a steering wheel rim (12) of the steering wheel (10) includes a cross-section centered on an annular centerline of said steering wheel rim (12), said decorative trim (16) completely encompassing the circumference of the cross-section of said steering wheel rim (12) or several decorative trims (16) adjoining each other along the circumference of the cross-section of said steering wheel rim (12).

13. The method according to claim 1, wherein said multilayered decorative trim (16) is applied to said steering wheel body part (14) by means of adhesive bonding.

14. The method according to claim 1, wherein adapting said decorative layer (26) is effected by means of punching.

15. The method according to claim 1, wherein said decorative layer (26) is formed into an arcuate cup after cutting-off.

16. The method according to claim 1, wherein said decorative layer (26) is cut off from said multilayered body (22) by planing.

17. The method according to claim 1, wherein the decorative layer is applied to the steering wheel body part such that every flat layer abuts the steering wheel part.

18. The method according to claim 1, wherein the steering wheel body part has an annular centerline, the decorative layer being applied to the steering wheel body part such that all of the flat layers extend radially from the annular centerline.

19. The method according to claim 1, wherein the bending axis extends parallel to an edge of the multilayered body.

20. A method for producing a steering wheel including a multilayered decorative trim for a steering wheel rim having an annular centerline, the method comprising the steps of:

providing a multilayered body comprising a plurality of flat layers joined to each other, a pair of the flat layers defining an interface that extends in a plane;

bending the multilayered body about a bending axis extending parallel to the plane of the interface into a shape of the steering wheel rim;

cutting off an arcuate decorative layer from a lateral surface of the bent multilayered body that extends in a plane that intersects the bending axis, and applying the decorative layer to the steering wheel rim such that all of the flat layers extend radially from the annular centerline of the steering wheel rim and abut the steering wheel rim to form the multilayered decorative trim.

21. The method according to claim 20, wherein the bending axis extends parallel to an edge of the multilayered body.

\* \* \* \* \*